Nov. 29, 1955 G. W. GRAY ET AL 2,725,500
DEFLECTION SYSTEM
Filed April 21, 1950
2 Sheets-Sheet 1
Fig_1
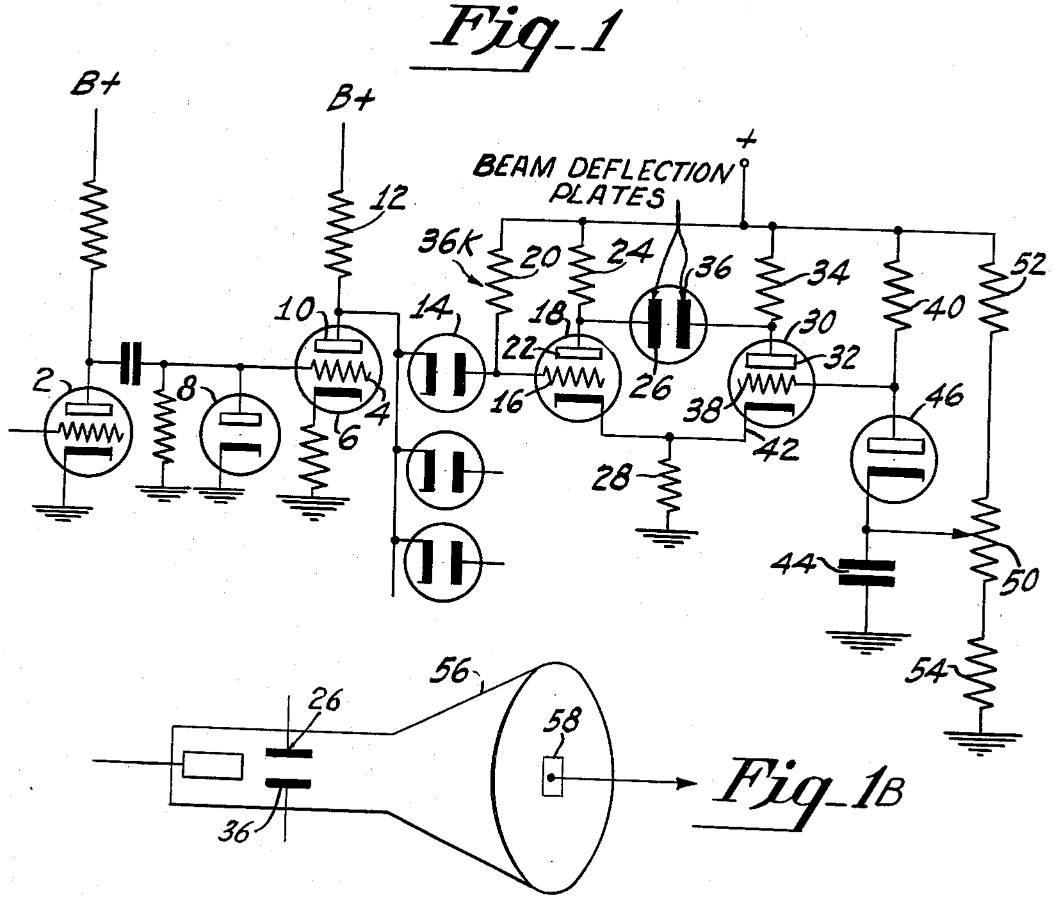
Fig_1, Fig_1B
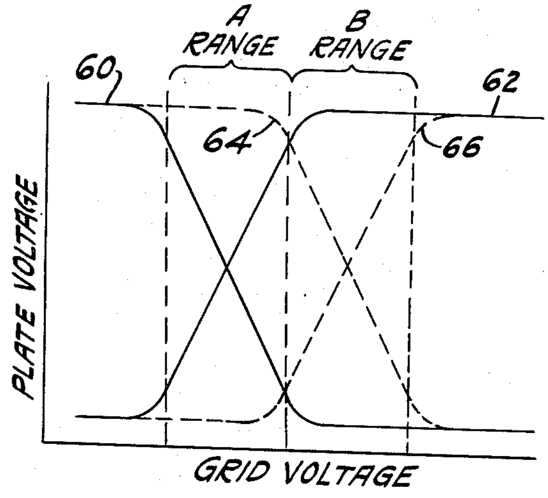
Fig_1c
Inventors
George W. Gray AND
Arthur S. Jensen
BY
[signature]
ATTORNEY Nov. 29, 1955 G. W. GRAY ET AL 2,725,500

DEFLECTION SYSTEM

Filed April 21, 1950 2 Sheets-Sheet 2

Inventors
George W. Gray AND
Arthur S. Jensen
BY
ATTORNEY

United States Patent Office 2,725,500

Patented Nov. 29, 1955

2,725,500

DEFLECTION SYSTEM

George W. Gray, Lambertville, and Arthur S. Jensen, Princeton, N. J., assignors to Radio Corporation of America, a corporation of Delaware Application April 21, 1950, Serial No. 157,244

5 Claims. (Cl. 315—20)

This invention relates to apparatus for and methods of deflecting the beams of a plurality of cathode ray tubes.

The number of completely separate bits of information that can be represented in the target of a cathode ray tube is limited by the spot size and shape. The number can be increased by deflecting the beam through wider angles so that it traverses a greater area on the target surface. Naturally, there are practical limits to the width of the angle that can be employed. At first it might appear that more separate bits of information could then be represented by a larger tube. Unfortunately, however, the spot size of the cathode ray beam increases as the size of the tube increases. It therefore becomes necessary to operate a plurality of tubes if it is desired to represent more separate bits of information than a single tube can reproduce.

Deflecting the beams of a large number of tubes may require large amounts of power if it is accomplished by previously known methods. However, in accordance with this invention, the power required is little more than that necessary to deflect the beam of a few tubes. This is accomplished by deflecting only a few of the beams at a time. The deflection circuits of the other tubes are effectively separated from the source of deflection energy and therefore cannot put a load on it. In this way, the beam of a cathode ray tube is swept across its target only when the segment of information it is to represent appears in the deflection wave. When one beam leaves its target another starts across its target so that there are no gaps in the total information supplied by all the targets.

The following paragraphs emphasize various requirements that may be placed upon a deflection system for a plurality of cathode ray tubes.

In some applications it is necessary that the beam of each one of the plurality of cathode ray tubes be swept across its target in a linear fashion. For example, a linear sweep would normally be required if a large televised image were reproduced by a plurality of kinescopes.

Other applications require that the deflection of the cathode beam be a function of the signal being represented by the beam. For example, in certain quantizing systems each cathode ray tube provides a gating pulse only when the signal applied to its deflection plates lies within a predetermined range.

In addition to the requirements noted above, it is sometimes necessary that the deflection system have a memory. This means that the beam must traverse its target in one direction as the signal increases and in the opposite direction when the signal decreases. For example, if cathode ray storage tubes are employed in certain types of computers, the beam is deflected in accordance with a random signal. As the beam traverses the storage tube in one direction from one side to the other, it reproduces assigned bits of information. If the beam were permitted to fly back to the side where it started, it would erase some of the information previously deposited and thus upset the calculations. Blanking might be employed to prevent these undesirable effects. However, when the deflection is at random, circuits for producing blanking during the retrace might be extremely complicated. Generally speaking, linear deflection would be preferable in such a system.

Deflecting apparatus incorporating the principles of this invention can meet all of these requirements.

It is therefore the primary object of this invention to provide means for and methods of successively deflecting the beams of a plurality of cathode ray tubes with a maximum efficiency.

It is another object of this invention to deflect linearly and successively the beams of a plurality of cathode ray tubes across their targets with minimum power.

Another object of this invention is to provide means for successively deflecting the beams of a plurality of cathode ray tubes in such a way that the beams scan in one direction with an increasing signal and in the opposite direction with a decreasing signal.

These and other objects and advantages will become apparent from a detailed consideration of the drawings in which:

Figure 1 illustrates a form of a deflection circuit incorporating the principles of this invention;

Figure 1B illustrates the type of cathode ray tubes with which the deflection circuit of this invention may be employed;

Figure 1C illustrates graphically the variations in plate and grid voltage that take place during the operation of the deflection circuit of Figure 1;

Figure 2:
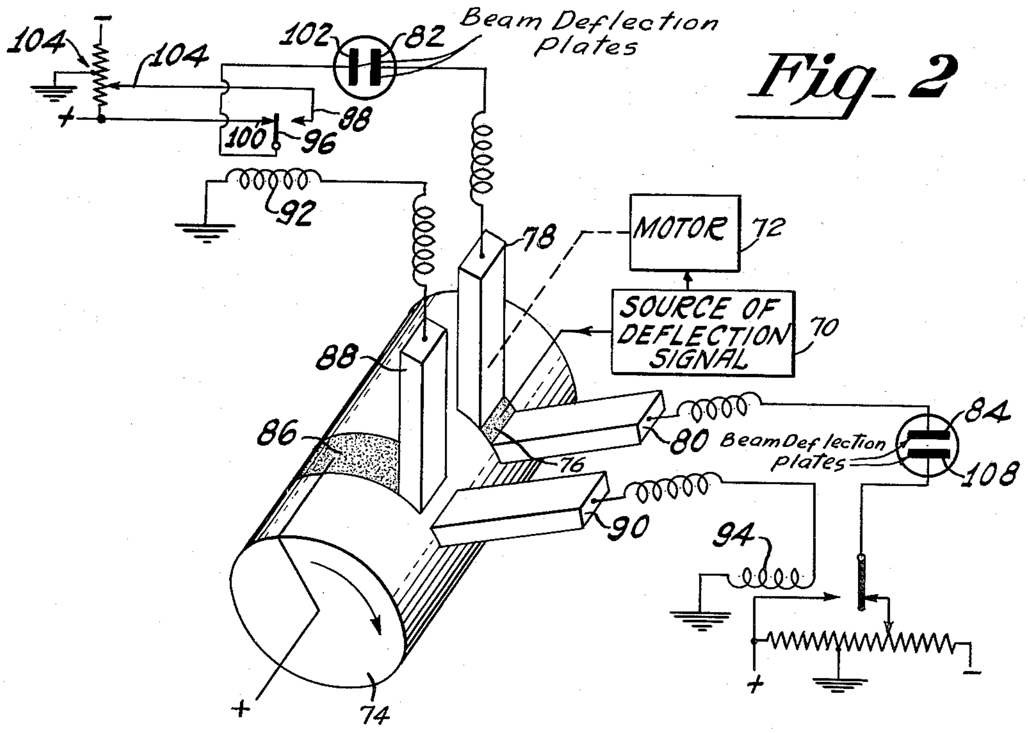
Figure 2 illustrates another form which this invention may assume.

The following discussion relates to the details of the range gate illustrated in Figure 1. After being amplified by an amplifier tube 2 the deflection voltage wave is applied to a grid 4 of an output amplifier tube 6. The grid 4 of the amplifier 6 is clamped to ground potential via diode 8 in accordance with well known principles. A plate 10 of the output amplifier 6 is connected to a source of B+ potential via a load resistor 12. It is also connected to the cathodes of a number of diodes 14, each of the diodes being associated with a deflection circuit for a particular cathode ray tube. Only one of these deflection circuits is shown for purposes of simplicity, and it will be assumed that the others are of similar construction. Any differences in adjustments will be pointed out as the description proceeds.

The deflection signals are fed via a diode 14 to the grid 16 of an amplifier 18. The grid 16 is returned to B+ potential via a high resistance 20. The plate 22 of the amplifier 18 is returned to B+ potential via low resistance 24. The size of the resistor 24 controls the upper frequency response of the deflection system. The plate 22 is also connected to one of the deflection plates 26 of the cathode ray tube associated with this particular deflection circuit. It will also be apparent to those skilled in the art that deflection could be accomplished by inserting a deflection coil in series with the plate 22.

In order to obtain push pull deflection, the amplifier 18 is cathode coupled via a common cathode load resistor 28 to another amplifier 30. The plate 32 of the amplifier 30 is connected to B+ via a low resistance 34. It is also connected to the other deflection plate 36 of the cathode ray tube and controls the upper frequency response of the deflection circuit. The grid 38 of the amplifier 30 is returned to B+ through a resistor 40.

Because the amplifier 30 receives its input signal at its cathode 42, means must be provided for grounding the grid 38 for alternating current potentials. Ordinarily, this can be accomplished by insertion of a condenser such as a condenser 44 between the grid and ground. The grid 38 can be prevented from charging the condenser 44 when it becomes negative by the insertion of a diode 46 as shown. The desired bias for the grid 38 is derived by connecting the movable arm of a potentiometer 50 to the junction between diode 46 and the condenser 44. The potentiometer 50 is connected in series with resistors 52 and 54 between ground and B+ potential.

*Operation*

The overall operation of the circuit described above will now be explained in connection with Figures 1B and 1C. The deflection plates 26 and 36 of Figure 1 might be associated with the cathode ray tube 56 as shown in Figure 1B. In this particular tube the cathode ray beam is deflected in a vertical direction. The only useful output provided by this tube occurs when the beam intersects or impinges upon the target 58. If there are to be no gaps in the waveform of the sums of the outputs of the cathode ray tubes, it is apparent that the beam of one tube must leave its target, as the beam of another tube impinges upon its target. The manner in which this is accomplished will be apparent from a consideration of voltage variations taking place in the circuit of Figure 1 as illustrated in Figure 1C.

Waveform 60 of Figure 1C illustrates the variation in voltage of the plate 22 of the amplifier 18 and waveform 62 illustrates the potential variation of the plate 32 of the amplifier 30. The dotted curves 64 and 66 illustrate the corresponding voltage variations of the plates of the amplifiers at the deflection circuit of the cascaded cathode ray tube that goes into operation just as the cathode ray tube of Figure 1 ceases.

Assume that the deflection voltage wave applied to the cathode of the diode 14 has a very low value. Under these conditions, the B+ potential draws current through the diode 14 and the rather large resistor 20 so that the grid 16 of the amplifier 18 is sufficiently negative to bias the tube to cut off. The amplifier 30 will therefore be conducting. If the setting of the potentiometer 50 is correct, the amplifier 30 will be saturated when the amplifier 18 is cut off.

As the deflection voltage applied to the cathode of the diode 14 increases in a positive direction, the current drawn through the diode 14 decreases. Thus, the potential of the grid 16 increases in a positive direction. The upper flat portion of the curve 60 illustrates the potential of the plate 22 during the time the grid 16 is below cut off. However, as soon as the potential of the grid 16 reaches cut off, the amplifier 18 starts to conduct. As the grid increases further in potential, the amplifier 18 conducts more and more and the voltage of its plate 22 falls as illustrated by the sloping portion of the curve 60. The increasing current drawn by the amplifier 18 places an increasing potential on the cathode 42 of the amplifier 30 so that its plate voltage gradually increases, as indicated by the sloping portion of the curve 62. At the point where the two curves cross, the potential applied across the deflection plates 26 and 36 is zero. At this point the beam should be centered on its target. This point of intersection will be half way between the flat portions of the curves 60 and 62. The grid voltage at which this intersection occurs depends upon the value of the common cathode resistor 28. The larger it is, the more grid voltage is required to reach this point. The grid potential at which the intersection occurs is also dependent upon the setting of potentiometer 50, since this sets the bias on grid 38. Variation of this bias by adjusting potentiometer 50, therefore, is a convenient method of centering the scan of the associated cathode ray tube independently of the other cathode ray tubes operated with it. At the left hand side of this intersection the plate 26 is positive with respect to the plate 36 and on the right hand side of the intersection the plate 36 is positive with respect to the plate 26, thus giving push pull deflection of the cathode ray beam.

The variation in deflection voltage may extend over two successive ranges A and B as shown in Figure 1C. One cathode ray tube should produce a useful response until the next starts in order to prevent gaps in the total response. Therefore, the beam of one cathode ray tube scans its target until the deflection voltage reaches the intersection of the solid and dotted curves. At this point the other cathode ray beam starts to scan its target.

As the signal applied to the cathode of the diode 14 further increases and raises the grid 16 to cathode potential, the grid 16 begins to draw current. The diode 14 then opens up and electronically isolates the grid circuit of the amplifier 18 and thus the whole range gate from the low impedance of the output amplifier 6. If this diode were not present, an excessive amount of grid current would be drawn through the low impedance of amplifier 6 so as to damage the grid 16.

*Operation without diodes*

The diodes 14 and 46 may be eliminated with some sacrifice in efficiency by the suitable choice of values for the cathode resistors 28 in the various deflection circuits. As pointed out above, the diode 46 prevents the condenser 44 from becoming negatively charged when grid 38 goes negative because of grid current. This would normally occur when the amplifier 18 is cut off and the amplifier 30 is saturated. If the cathode resistor 28 is sufficiently large, however, the cathode 42 remains slightly positive with respect to the grid 38, even though the amplifier 18 is cut off. Since no grid current can be drawn under this condition, the grid 38 never becomes negative with respect to the potential supplied by potentiometer 50.

The diode 14 was inserted primarily to prevent the drawing of excessive grid current from the grid 16 of the amplifier 18. Here again, if the cathode resistor 28 is sufficiently large, the most positive deflection signal does not cause the grid 16 to draw current. The reason for this is that the current drawn by the amplifier 18 through the large common cathode resistor 28 is sufficient to cut off the amplifier 30 before the amplifier 18 becomes saturated. The impedance that the cathode of the amplifier 18 sees is increased when the amplifier 30 is cut off. Therefore, it is more difficult to overdrive the amplifier 18 and hence to draw grid current.

As the beams of more and more cathode ray tubes are deflected, circuits such as just described become more and more inefficient. For this reason, it may be preferable to use the diodes as explained in connection with Figure 1. The reason for this increasing inefficiency is that the size of all the cathode resistors 28 must be increased as more cathode ray tubes are added to the deflection system. This increase in size is necessitated by the fact that the current drawn through the cathode resistor 28 must produce enough voltage to cut off the amplifier 30 near the end of the range assigned to a particular deflection circuit. Therefore, if the number of cathode ray tubes is increased, the smaller is the range over which each has to operate. In other words, since less current variation is available to cut off the amplifier 30, the cathode resistor 28 must be larger.

If this resistor is larger, the amplifier 30 operates further below saturation. Consequently, the maximum voltage swing it can apply to the deflection plate 36 is much reduced.

The increase in the size of the cathode resistor 28 also limits the voltage swing that the amplifier 18 can apply to the other deflection plate 26. After the amplifier 30 is cut off, push pull operation is no longer available and so some of the capacity of the amplifier 18 is wasted.

The important point to note in the operation of range gates described above is the fact that, when the amplifier 18 is cut off or saturated and the amplifier 30 is cut off or saturated, and the beam acted upon by the deflection plates 26 and 36 comes to a rest position. As the beam is no longer being deflected, no power is drawn from the output amplifier 6 for this purpose. The range gates therefore effectively apply the deflection signal to the means for deflecting a particular electron beam only when the deflection signal lies within a predetermined range. Outside of this range the deflecting means are electronically isolated from the source of the deflection waves.

Furthermore, the beam always travels across the target in a given direction when the deflection signal is increasing and in an opposite direction when the deflection signal is decreasing. Thus, the device has a memory. In addition to this, it will be noted that the sweep across the target is linear.

The setting of the potentiometer 50 is preferably adjusted so that the amplifier 30 cuts off at the same time that the amplifier 18 saturates. The resistor 40 is large in comparison with the resistors 52, 50 and 54. As the grid 38 of the amplifier 30 is connected through the resistor 40 to B+ potential, grid current can be drawn so as to make the grid 38 negative with respect to the potential at the movable arm at the potentiometer 50. If it were not for the diode 46 this negative potential could be stored on the condenser 44. Thus, when the deflection signal again operates the deflection circuit, the potential on the grid 38 might be such that the amplifier 30 would cut off before the amplifier 18 saturated. This means that the D.-C. potential of the grid 38 would vary in accordance with the deflection voltage wave applied to the diode 14. The effect would be to move the solid line 62 of Figure 1C left or right and thus change the point of intersection with the solid line 60. This means that the centering of the beam of the particular cathode ray tube associated with the plates 26 and 36 would be altered. Thus, in addition to a gap in the combined output of the cathode ray tubes, two of them might be turned on at the same time. This, of course, is undesirable.

Figure 2 illustrates entirely different apparatus for carrying out the functions performed by the electronic apparatus of Figure 1. In this arrangement the deflection voltage wave is supplied by a source 70 to a motor 72 which serves to rotate the cylinder 74. The cylinder is made of non-conducting material. The deflection signals from the source 70 are also applied to a strip of current conducting material 76. This strip is "*a*" units wide and is mounted on the outside of the cylinder 74. Brushes 78 and 80 are mounted in a fixed position and in the same radial plane as the strip 76. The brushes may be any desired width but the adjacent edges of the surfaces in contact with the outside of cylinder 74 must be separated by the width of the strip 76. In this way, the brush 78 just breaks contact with the strip 76 as the brush 80 makes contact with the strip. The brushes 78 and 80 are connected to deflection plates 82 and 84 respectively of two cathode ray tubes. It will be understood that if it is desired to deflect the beams of more than two cathode ray tubes that additional brushes similar to 78 and 80 can be added. However, for the sake of simplicity, they have not been shown.

A second radial strip 86 of current conducting material is mounted on the outside surface of the cylinder 74. One end of this strip is circumferentially displaced from an edge of the strip 76 by an amount equal to the width *b* of the brushes 78 and 80. A second group of stationary brushes such as 88 and 90 are mounted so as to contact the strip 86 as the cylinder 74 rotates. These brushes are identical to the brushes 78 and 80 and are axially parallel to them. The brush 88 is connected to ground through an energizing coil 92. The brush 90 is similarly connected to ground through an energizing coil 94. A source of positive potential is connected to the strip 86 so that when the brushes 88 and 90 make contact with the strip 86 the coils 92 and 94 are respectively energized. The coil 92 serves to move the central arm 96 of a switch from the right hand contact 98 to the left hand contact 100. The central arm 96 is connected directly to a deflection plate 102 that works in conjunction with the deflection plate 82. The left hand contact 100 is connected to the positive end of a potentiometer 104. The right hand contact 98 is connected to the movable arm of the potentiometer 104, as shown.

When the brush 88 is not in contact with the strip 86, and the coil 92 is not energized, the movable arm 96 is in contact with contact point 98. This means that a negative potential is applied to a deflection plate 102, thus forcing the electron beam toward the deflection plate 82. When, however, the brush 88 is in contact with a strip 86 the coil 92 is energized and the movable arm 96 is in contact with the contact arm 100. The deflection plate 102 is then connected to a source of positive potential and the electron beam is attracted toward it.

It is not believed necessary to describe the components of the switch arrangements associated with deflection plate 108 that work in conjunction with deflection plate 84, as it is precisely the same as that which has been described in connection with plate 102.

In the position shown, the brush 78 is just breaking contact with the strip 76 and the brush 88 is just making contact with the strip 86. On the other hand, the brush 80 is just making contact with strip 76 and the brush 90 is not making contact with any strip. This means that the deflection signals supplied to the strip 76 are applied to the deflection plate 84. They will continue to control the deflection of the beam associated with the plate 84 until the cylinder 74 has rotated so that the brushes 80 and 90 occupy the same position with respect to the strips 76 and 86 as the brushes 78 and 88 in the positions shown. As soon as brush 90 contacts the strip 86, the potential applied to the deflection plate 108 will be such as to attract the beam toward it. If the deflection signal should now reverse in direction, the beam of the tube associated with the deflection plates 84 and 108 is deflected back across its target in the opposite direction. When these signals are no longer applied to deflection plate 84, the potential applied to plate 108 will be of such magnitude as to maintain the beam on this side of the target.

Figures 3, 3A:
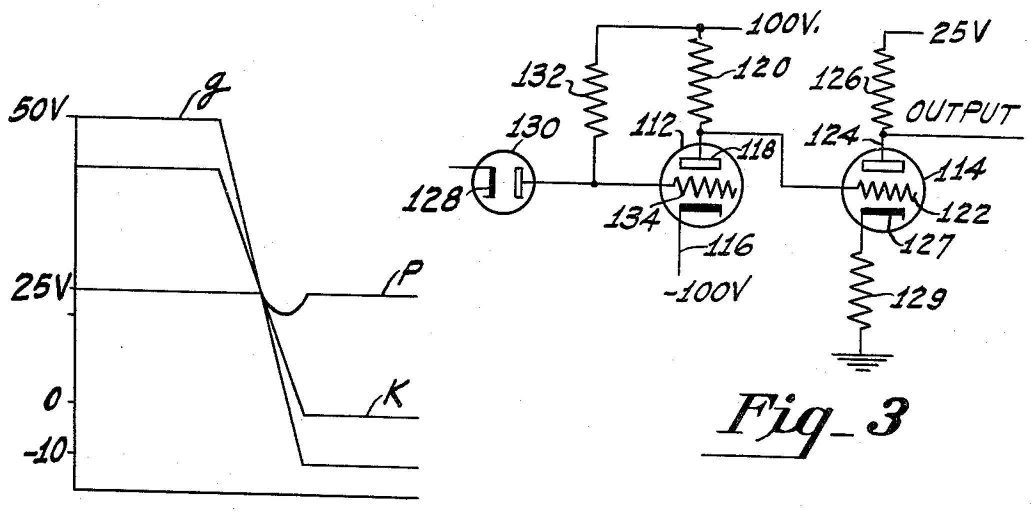
Figure 3 illustrates a type of circuit incorporating certain features of this invention that may be employed to deflect a beam of electrons into a target area and back out the same side.
Figure 3A illustrates the changes in voltage taking place in the circuit arrangement of Figure 3.

The circuit arrangement of Figure 3 illustrates how efficient deflection of the beams of a plurality of cascaded cathode ray tubes can be obtained where it is not desired that the deflection system have a memory. In this arrangement, the beam enters and leaves its target from the same side as the deflection signal increases.

Figure 3 shows two amplifiers 112 and 114. The cathode 116 of the amplifier 112 is connected to a negative potential of 100 volts. The plate 118 of the amplifier 112 is connected to a positive potential of 100 volts via a load resistor 120. The plate 118 is connected to a grid 122 of the amplifier 114. The plate 124 of the amplifier 114 is connected via a load resistor 126 to a positive potential of 25 volts. The cathode 127 of the amplifier 114 is connected to ground via a cathode resistor 29. The deflection signals are connected to a cathode 128 of a diode 130. The plate of this diode is connected to a positive potential of 100 volts via a grid leak resistor 132 and to a grid 134 of the amplifier 112.

*Operation*

The operation of the circuit described above will now be discussed in connection with Figure 3A in which curve G illustrates the voltage variation of the grid 122, curve P the voltage variation of the plate 124, and curve K the voltage variation of the cathode 127 of the amplifier 114.

When the deflection wave is sufficiently negative, the current passing through the grid leak resistor 132 will bias the amplifier 112 to cutoff. If the load resistor 120 equals the resistance from the grid 122 to ground, the potential of the grid 122 will be approximately 50 volts as shown. Because of the cathode resistor 127 the potential of the cathode 129 will be nearly 50 volts. The amplifier 114 is cut off as its maximum plate potential is 25 volts. As deflection signal gets more positive, the amplifier 112 begins to conduct, thus lowering the potential of the grid 122 and the cathode 127 as shown. The difference between the grid and cathode potentials gradually diminishes until the cathode potential becomes 25 volts. It will be remembered that this is the value of the B+ supply for the amplifier 114. Therefore, the amplifier 114 begins to conduct so as to raise the cathode 127 to the same potential as the grid. The plate 124 now goes below 25 volts. As the deflection signal becomes more positive, the potential of the grid 122 falls below the potential of the cathode 127 as shown.

Thus, when the deflection wave is below the range of operation of this circuit, the beam is not being deflected as the amplifier 112 is cut off. When the deflection wave is above the range of operation of this circuit, the beam is not being deflected as the amplifier 114 is saturated. However, such an arrangement does not have a memory as the beam enters and leaves the target from the same side.

The following advantages are to be derived from the use of this invention: a lower B+ supply, expensive driving tubes can be eliminated, separate centering is provided for each range, a simple direct current restoration is possible without interference from the centering controls, the deflection of each tube is limited so as to prevent the beam current from either loading the deflection plates or producing secondary emission electrons when it strikes them. Another advantage of the invention is the fact that it permits electronic deflection circuits such as illustrated in the Figures 1 and 3 to operate at extremely high frequencies.

Having described our invention, what is claimed is:

1. An apparatus for deflecting a cathode ray beam in response to a predetermined range of a signal from a source comprising in combination means adapted to deflect a cathode ray beam in response to a signal, a range gate adapted to apply said signal to said deflecting means when said signal lies within said given range, and means for electronically isolating said range gate from said source when said signals are outside said range.

2. An apparatus for deflecting a cathode ray beam during a predetermined range of a signal comprising in combination means for deflecting a cathode ray beam, means for applying said signal to said deflecting means only while it is within said predetermined range, said means for applying said signal to said means for deflecting the beam being adapted to hold the beam in one position when said signal exceeds said range and in another position when said signal is less than the lower limit of said range.

3. A deflecting apparatus comprising in combination a source of signals, means adapted to deflect and maintain a beam of electrons in a predetermined deflected position, and means connected between said source of signals and said deflecting means for controlling said deflecting means such that said beam is deflected to a different position only when said signals lie within a predetermined range of values.

4. A beam deflecting apparatus comprising in combination a source of signals that may extend over a plurality of ranges, means for deflecting a beam of electrons, means for applying a voltage to said deflecting means so as to maintain the associated beam of electrons in at least one position for values of said signal lying outside a predetermined one of said ranges, means for applying a voltage to said deflecting means so as to move said beam to a different position for values of said signal lying within said range, said deflecting means being electronically separated from said source when said signal lies outside said predetermined range.

5. A beam deflecting apparatus comprising in combination a source of deflection signals, a first amplifier having at least a plate, a grid and a cathode, means for deflecting a beam of electrons connected to its plate, its grid being connected to said source, a second amplifier having at least a plate, a grid and a cathode, said plate being connected to another beam deflecting means, its grid being effectively grounded for alternating current potentials, a source of fixed potential connected to the grid of said first amplifier and the cathodes of said first and second amplifiers being connected to another source of fixed potential by a common impedance, said cathode resistor being sufficiently large to prevent the grid of said first amplifier from drawing current as the deflection signals applied to it increase beyond a predetermined level.

References Cited in the file of this patent

UNITED STATES PATENTS

| | | |
|---|---|---|
| 2,246,168 | Dome | June 17, 1941 |
| 2,250,479 | Goldmark | July 29, 1941 |
| 2,264,197 | Hadfield | Nov. 25, 1941 |
| 2,315,848 | Geohegan | Apr. 6, 1943 |
| 2,404,099 | Schade | July 16, 1946 |
| 2,412,210 | Edson et al. | Dec. 10, 1946 |
| 2,414,228 | Gottier | Jan. 14, 1947 |
| 2,431,766 | Miller et al. | Dec. 2, 1947 |
| 2,449,549 | Byrne | Sept. 21, 1948 |
| 2,508,926 | Milwitt et al. | May 23, 1950 |
| 2,517,712 | Riggen | Aug. 8, 1950 |
| 2,617,964 | Blayney | Nov. 11, 1952 |